Figure 1:
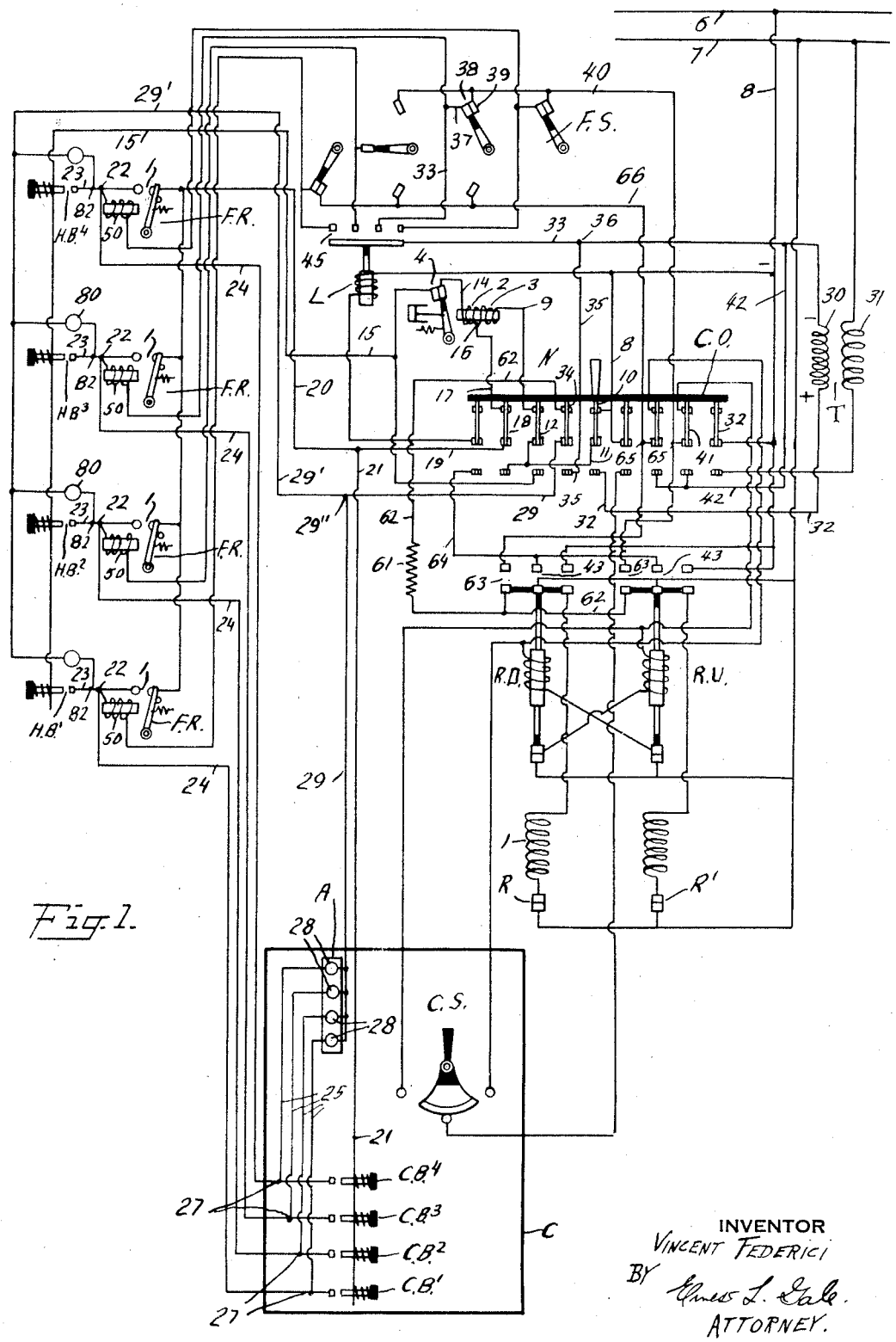

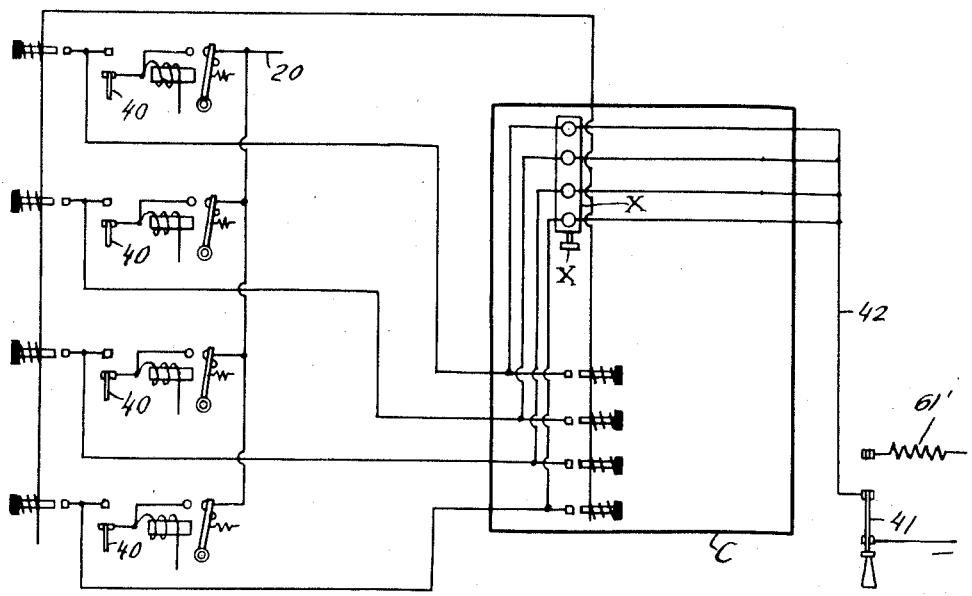
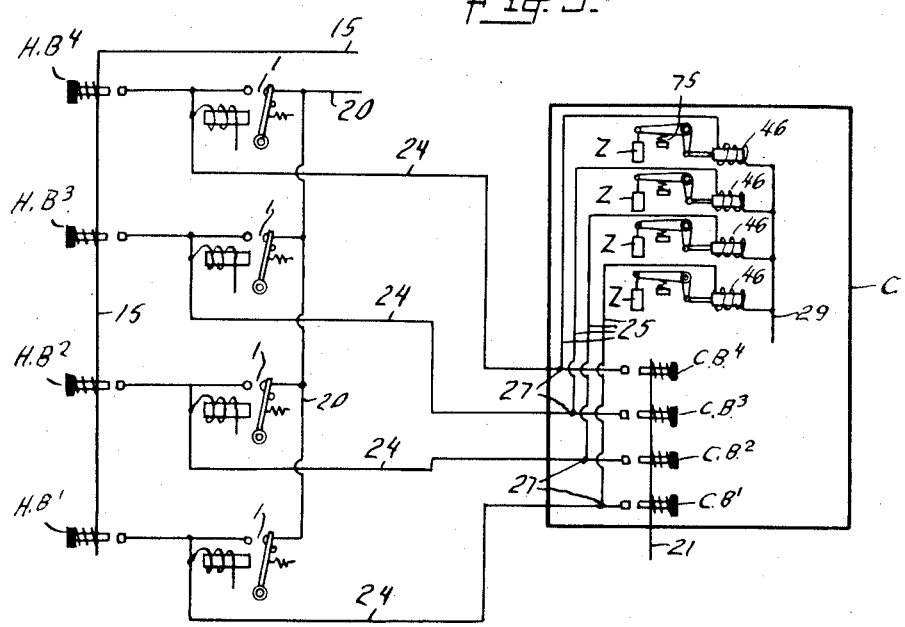

Patented Jan. 9, 1934

1,942,415

UNITED STATES PATENT OFFICE 1,942,415

DUAL SYSTEM OF CONTROL FOR ELEVATOR

Vincent Federici, Bronx, N. Y., assignor to Gurney Elevator Company, Inc., New York, N. Y., a corporation of Pennsylvania Application August 31, 1929. Serial No. 389,718

15 Claims. (Cl. 187—29)

My invention relates to a dual system of control for elevators:

As is well known certain of the essential control elements of dual systems of control now in common use comprise a push-button system of control circuits and apparatus, a car switch and circuits controlled thereby, a double throw change-over switch and an annunciator in the car. According to present practice an independent set of wires for the annunciator extends from said change-over switch attached to a control switch panel located usually in a basement or overhead, to the annunciator box in the car and the cost for installation as well as material is considerable.

Hence one of the objects of the present invention is to eliminate the extension of said independent set of wires from the change-over switch to the car and use the wires already at hand or in other words, the car control wires which connect with the push-buttons in the car, with wires for the annunciator in the car tapped therefrom so that in effect the annunciator system wiring involves only the extension of wires from the push-button box on the car to the annunciator box thereon and the extension of only a single or common return wire from the car to the board as contradistinguished from the old way in which the number of wires for the annunciator which extend from the control board to the car correspond in number to the number of floors served plus the common return wire.

In dual control systems now in common use, by throwing the change-over switch to position for car switch operation, the floor-relays, floor-selector mechanism and non-interference device are in effect rendered inoperative, or in other words, disconnected from the push-button circuits and the latter circuits with the above elements excluded are connected with the heretofore mentioned independent set of annunciator wires. However, according to the present invention, when on car switch control, the only element of the push-button system which is rendered inoperative is the non-interference device so that the push-button system in its entirety remains effective to control the annunciator or signals to set them in response to actuated car and hall push-buttons, also to maintain them set and also to automatically reset or cancel each one only if and when a stop is made at its landing.

The hall buttons and car buttons require only single-push regardless of the position of the car and its direction of movement at the time they are actuated, to set or in other words, cause registration of their respective signals in the car and the arrangement eliminates the necessity of the car operator having to remember the stops for car passengers since they can call their stops as they enter the car and the calls can be pre-registered by the car buttons for observation by the operator.

A standard and well known type of floor-selector without change is employed for the control of the car control circuits of the push-button system, and when on car switch operation said floor-selector functions automatically to reset the signal corresponding to the floor-stopped at, and provision is made so that if the operator for any reason does not desire to make stops at landings for which a signal or call is registered, such calls will be maintained registered until the car does stop at their landings. In effect then, a signal is set immediately in response to actuation of its associated hall or car button, and is automatically reset or cancelled only if and when the car stops at its associated landing.

In the accompanying drawings Fig. 1 illustrates diagrammatically a typical dual system of control for elevators, embodying an annunciator system constructed and arranged in accordance with the present invention, and Figs. 2 and 3 illustrate applications of the invention to different types annunciators generally known as the "Drop" type.

The various elements which make up the dual system of push-button control are all of a standard and well known type having a well known mode of operation and in view of this the manner in which they function to control the car will be described only in a general way.

The system comprises an elevator car C adapted for operation by a hoisting motor (not shown) whose direction of rotation is controlled by electro-responsive reversing switches R, R'. These reversing switches through the intermediary of directional relays RU, RD control the hoisting motor to bring the car to any landing in response to actuation of hall buttons, $HB^1$, $HB^2$, $HB^3$, $HB^4$ or car buttons $CB^1$, $CB^2$, $CB^3$, $CB^4$ and automatically stop the car thereat, the control of the car after a button is momentarily pressed and then released being taken over by the floor-relay F. R. corresponding to the button pressed whose self-holding contacts 1 maintain the floor-relay in closed position. The self-holding circuit is opened at the floor-selector contacts F. S. when the car reaches the landing for which the button is pressed thus de-energizing the winding of whichever directional relay is closed, to cause automatic stop of the car. Any well known arrangement of non-interference device may be employed as for example, the one herein illustrated and designated N, having oppositely wound windings 2 and 3. It operates to open-circuit at its contacts 4, a common feed wire 15 leading to the hall push-buttons to render the hall buttons inoperative while the car is in operation.

Wires 6 and 7 constitute mains of an A. C. source of supply from which the system may be operated for push-button control of the car.

A common feed for the hall-button wires may be traced from the main 6, wire 8, to wire 9 by way of blades 10 and 12 of the change-over switch S, and also wire 11, through the oppositely wound windings 3 and 2 to wire 14, contacts 4, and wire 15 common to the hall push-buttons. The self-holding circuit for the floor-relays and also the common feed for the car push-buttons is the same as just traced up to the junction point 16, then by wire 17, blade 18, wire 19 which branches at junction 19' to form parallel circuits 20 and 21, the former being a common feed extending to the self-holding contacts of the floor-relays, and the other being a common feed for the car buttons.

One of the terminals 22 of each floor relay winding is connected to its associated hall and car push-button by way of parallel wires 23, 24 respectively, which as will be observed form a junction with each other at 22. These wires of course form the standard parts of the push-button control system through the agency of which the car is controlled from the hall and car push-buttons. Wires 25 for the annunciator on the car designated as a whole A, are tapped as at junctions 27, or in other words, at points adjacent the car push-buttons, onto the car control wires 24 which connect with the car push-buttons and each wire 25 connects with one terminal of its associated signal 28 and the other terminal of each signal is connected to a common return wire 29. Since the car control wires 24 already at hand are utilized for the signal system on the car controllable from both the hall and car buttons, the additional set of wires as heretofore used for the signal system, extending from the change-over switch on the control panel to the signal system in the car is eliminated and the only additional wiring is that involved in extending the signal wires 25 from the push-button box on the car to the signals and extending the common return wire 29 to the control board, the cost of which is negligible as compared with the cost of the wiring accessories and labor which are eliminated.

The signals illustrated herein are in the form of electric lights one for each landing but they may be of any of the well known types as now commonly used one of which, for example, is identified in the trade as a "Loc-Drop", which may be of the manual re-set type as illustrated in the Fig. 2 modified arrangement, or of an automatic re-set type, with an operating winding for each drop maintaining it in set position, as illustrated in the Fig. 3 arrangement and with the automatic re-set being accomplished in a new and novel manner through the agency of the car control floor-selector already at hand and without the use of any additional control mechanism such as a commutating machine as is now commonly employed together with a re-set coil to accomplish the same result.

The operation of the control and signal system when on car switch operation is as follows:— throwing the change-over switch C. O. from its upper position as illustrated to its lower position in effect transfers control of the car through the intermediary of the relays RU and RD, from the push-button system to a car switch designated C. S., the push-button system and the annunciator system is disconnected from the high voltage mains 6 and 7, and connected to a lower voltage source of supply as for example to the secondary winding 30 of a transformer T whose primary winding 31 is now connected with the high voltage mains by switch blade 32. Changing the position of the blades 10, 12 and 18 in effect renders the non-interference device inoperative and connects the common feed wires 15 and 21 for the hall and car buttons respectively, also the self-holding wire 20, directly with one side of the low-voltage supply as by wire 32 so that in effect any hall or car push-button is effective by single-push to register the call, whereas the non-interference device when operative renders all hall buttons inoperative while the car is in operation. For example, assume that the third landing hall-button HB³ is pushed. A circuit for the third landing light in the car is completed and another circuit in parallel therewith is completed for the winding of the third landing floor-relay and the latter will close its self-holding contacts 1 so that in effect, after the initial energizing circuit is opened by releasing the button, the self-holding circuit 20 will now feed the floor-relay winding 50 and the signal light in parallel. In this manner the third landing signal will be maintained after the button is released and said signal will be cancelled and the floor-relay will be reset when the car reaches the third landing, by operation of the floor-selector contacts to open said self-holding circuit, but said cancellation and reset is effective only if and when the operator stops at said landing. If a stop is not made at said landing, an electro-responsive switch L which is closed only when the car is running and on car switch operation, completes a by-pass circuit 33 around the floor-selector contacts to maintain said self-holding circuit energized during movement of the common contact of the floor-selector by the car, from one closed circuited position to the other closed-circuited position and in consequence the signal is maintained registered or set by said switch L and the floor-relay is maintained set during this opening of the self-holding circuit at the floor-selector contacts.

The circuits completed by actuation of the third landing hall-button may be traced as follows:— from wire designated plus of the transformer, wire 32, blade 10, wire 11, blade 12 to wire 15', wire 15, hall-button HB³, wire 23 to junction 22, thence by wire 24 to junction 27, wire 25 and lamp corresponding to the third landing, wire 29, blade 34, wire 35, and thence to a junction 36 with wire 33 which connects with the minus side of the secondary winding of the transformer. An energizing circuit for the winding of the third landing floor-relay is in parallel with the circuit just traced and branches therefrom at junction 22, thence through floor-relay winding, wire 37, common contact 38 of the floor-selector F. S. corresponding to the third landing, "up" selector contact 39, common wire 40, blade 41, and thence by wire 42 to the minus side of the secondary winding of the transformer.

The floor-relay closes its self-holding contacts 1 thus to close at that point a feed from the wire 20 which in effect maintains the floor-relay energized after its push-button is released and also maintains the signal registered or set and operation of the floor-selector, provided a stop is made, opens this self-holding circuit of the floor-relay winding so that the contacts 1 open thereby to re-set the floor-relay and also cancel the call at the annunciator.

With the change-over switch set for push-button control of the car, the annunciator system or signal lights remain operable but at this time the voltage supplied thereto from the high voltage mains 6 and 7, is reduced by a resistor 61 in the common return circuit for the lights. A circuit including this resistor 61 extends from wire 29, by way of a knife blade 34 to wire 62, including resistor 61, contacts 63 of a direction switch, wire 64, to a junction 65 with wires 66 or 67 which are the usual common up and down wires extending from the floor-selector to the directional relay windings.

Operation of the car switch causes the car to run up or down and to stop at will through control of the directional relays RU and RD in a well known manner. So long as either relay is closed, its contacts 43 complete an energizing circuit for the winding 44 of switch L whose contacts 45 complete a by-pass circuit 33 around the contacts 38 for each floor, on the floor-selector.

It will be observed from the description already given that any hall or car buttons, by single momentary push thereof, regardless of the direction of movement of the car and its position when the buttons are actuated, register their calls by causing their respective lights to go "on", and the lights remain on and are canceled automatically only if and when the car stops at their respective landings. This is so since although the light and floor-relay circuits for each landing are opened momentarily at its corresponding floor-selector contacts when the car reaches the stopping zone, however, said circuits will be maintained by the switch L at such time if the car does not stop at the landing, and will be cancelled if the car does make a stop because under such condition, said circuits are open at both the switch L as well as at the floor selector contacts.

An indicating light 80 located at each landing may be provided, with wires 81 therefor tapped onto their respective hall-button control wires 23 at points 82 adjacent their associated hall-buttons, and a common return wire 29' may form a junction at 29" with the common return wire 29 for the car annunciator system A. These hall or landing indicating lights have utility especially when the car is on push-button control. In this connection it will be mentioned that it is now common practice to utilize a "car in use" light at each landing, all of which go "on" when the car is in use. In effect, however, these "car in use" lights are not distinctive in indicating to the hall passenger whether or not the control of the car is his nor whether the stop will be at his landing, as in case, for example, two hall passengers at different landings, press their hall-buttons almost at the same time, causing said "car in use" lights to go "on" so that the impression would be to each intending passenger that he has control of the car. However, with the indicating lights 80 herein provided and under the same circumstances as stated above, it is possible by hall button operation at which time the non-interference device is operative, for the lights to go "on" only one at a time, thus giving indication to the hall passenger that his button has control of the car and when the light goes out, this gives indication of arrival of the car at the landing.

In the Fig. 2 modified arrangement the well-known "Loc-Drop" annunciator X in the car is illustrated in a typical manner it being provided with a usual manual re-set button X'. In this arrangement the annunciator wires 25 are tapped off the car control wires 24 the same as in Fig. 1.

For car switch operation the change-over switch, illustrated for convenience by the separated blades 40, is thrown over to disconnect the floor-relays, etc., from the hall and car push-button circuits the same as in any standard type dual control system and a knife switch 41 in the common return wire 42 opens the common return circuit 42 containing the resistor 61' and closes another common return circuit 42' exclusive of said resistor. Possibility of a sneak due to the common wires 29 of Fig. 1, or 42 of Fig. 2 connecting one side of the lights in parallel, is precluded because as will be observed there is a completion of the return circuits 29 and 42 whether on push-button or car switch control whereas if said wire was open-circuited, such condition might give rise to possible sneaks by way of the parallel connected signals and wires 24 to the various floor-relay windings 50 to energize them independently of push-button operation and thus resulting in false operation. The car annunciator system is operative to be controlled from the car and hall push-buttons, and the wiring therefor is tapped from the car control wires at the push-button box in the car. It is obvious of course, that the main and only difference between the Fig. 2 arrangement and any well known type of duel system of control, so far as the annunciator system is concerned, resides in the elimination herein of the additional set of wires for the annunciator extending from the change-over switch on the control panel to the annunciator box in the car, and with such difference the operation of the annunciator when on car switch operation remains as usual so that any call is registered at any time but all calls are cancelled by operation of the re-set button X'.

In the Fig. 3 modified arrangement, the annunciators are of the Drop type and the system of wiring may be the same as in Fig. 1, but as illustrated herein, a setting coil 45 for each annunciator drop Z is substituted in the circuit of each wire 25 and connects with the common return wire 29 in place of the lamp 28 as illustrated in Fig. 1. In view of the complete and detailed description given in connection with Fig. 1 for the light circuits and the manner in which they are set to register the call, maintained "on" and automatically cancelled, it is obvious therefore that with the coils substituted for the lights, that the operation of any button at any time energizes its associated annunicator winding 46 to set its annunciator Drop and said windings are maintained energized to maintain the Drop in set or registered position when the button is released. Each winding 46 is de-energized thereby to reset its annunciator Drop only if and when the car stops at its landing, this re-set operation being effective by reason of the self-holding circuit for the winding 46 being opened at both the switch L, and at the floor-selector contacts corresponding to the landing stopped at. De-energization of the maintaining circuit for any "Drop", will in effect cause automatic re-set of the Drop due to the action of a spring 75, or weight or any other equivalent means.

Although the invention is illustrated and described in association with an A. C. source of supply, it will be understood, that in principle it is equally applicable for use in connection with a D. C. source of supply and also to any of the various types of annunciator and signal systems now in common use.

What is claimed:—

1. In combination, an elevator car, push-button controlled circuits to control the car from a landing and control circuits governed by push buttons in the car, and an annunciator in the car having a circuit responsive to the landing push-button, said circuit being by way of said car push-button control circuits to a point on the car wherefrom it branches to connect with said annunciator.

2. In combination, an elevator car, a push-button controlled circuit to control the car from the car, and an annunciator in the car having a circuit branching from said car control circuit at a point adjacent the car push-button and connecting with said annunciator.

3. In combination, an elevator car, a push-button at a landing, a push-button in the car, parallel circuits controlled by said push-buttons to control the car, said circuits forming a junction, and an annunciator in the car, having its circuit tapped onto one of said parallel circuits at a point adjacent the car push-button and connecting with the annunciator whereby the latter is responsive to both of said buttons and the circuit therefor in response to the landing button is by way of both of said parallel circuits up to said point wherefrom said tap is made.

4. In combination, an elevator car, a push-button system of circuits to control the car from each of a plurality of landings and control circuits governed by push-buttons in the car, and an annunciator on the car having circuits connecting with said system of control circuits governed by the car push-buttons at points adjacent those from which said control circuits are controlled from the car.

5. In combination, an elevator car, a push-button system of circuits to control the car from each of a plurality of landings and from the car, a signal at each of said landings, each of said signals having a circuit connecting with said car control circuit of its associated landing at a point adjacent the landing push-button and an annunciator in the car having circuits connecting with said system of control circuits at points adjacent the push-buttons in the car.

6. In combination, an elevator car, a push-button system of circuits controllable from each of a plurality of landings and from the car, an annunciator on the car having circuits connected with said system of circuits at points adjacent the push-buttons in the car, means controlled by said push-button system of circuits to control the car to start it and effect automatic stops at landings; a car switch system of circuits to control said means certain of said push-button circuits effective when the car is under car switch control, to control said annunciator to maintain registration of calls and to automatically cancel a call for each landing only if and when the car stops at its landing.

7. In combination, an elevator car, a push-button system of circuits controllable from each of a plurality of landings and from the car, an annunciator on the car responsive to said circuits and having connections with said circuits at a point adjacent the push-buttons on the car, a car switch system of circuits to control the car, and means comprising a floor-selector and a circuit controller effective to control said annunciator circuits to permit registration of calls by single push of said push-buttons regardless of position of the car and direction of car movement when actuated, and to cause cancellation of a call for a landing, only if and when the car stops at its landing.

8. In combination, an elevator car, a push-button system of circuits controllable from each of a plurality of landings and from the car, an annunciator on the car having circuits forming a junction with said car control circuits at points adjacent the car push-buttons, floor relays and directional floor selector mechanism responsive to said push-button system of circuits, and means operating jointly with said floor-selector to render said annunciator circuits effective to register calls by single push of the push-buttons, and to cancel a call for each landing only if and when the car stops at its landing.

9. In a dual system of control for elevators, the combination with the car, a push-button system of circuits, floor-relays and floor-selector mechanism to control the car, a car switch system of circuits, an annunciator system, a change-over switch effective for one position to condition said circuits to control the car by push button operation, and for another position thereof said first named circuits are rendered ineffective to control the car, and control of the car is transferred to said car switch system of circuits, but at the same time said push-button system of circuits, floor-relays and floor-selector mechanism remain effective to control said annunciator system.

10. In a dual system of control for elevators, the combination with the car, a push-button system of circuits, floor-relays and floor-selector mechanism to control the car, a car switch system of circuits, an annunciator system, a change-over switch effective to render said push-button circuits or car switch circuits effective to control the car, and when said car switch circuits are effective, said push-button circuits are effective to control said annunciator system, and calls registered by the annunciator are maintained registered by said floor-relays and cancelled by said floor-selector mechanism.

11. In a dual system of control for elevators, the combination with the car, a push-button system of circuits controllable from the landings and from the car, floor-relays and floor-selector mechanism to control the car in response to said circuits, a non-interference device to render control of said circuits by the landing buttons ineffective while the car is in operation, a car switch system of circuits, a change-over switch operable for one position to render said push-button system of circuits together with said non-interference device operable to control the car, and when thrown over to another position, it renders said car switch effective to control the car and renders said push-button circuits together with said non-interference device ineffective to control the car but said push-button circuits remain effective by single-push of the buttons to control said annunciator to register calls, said floor-relays operate to control said annunciator to maintain registration of calls, and said floor-selector mechanism operates to cancel registered calls.

12. In combination, the car, control circuits therefor operable from each of a plurality of landings and from the car, a car switch system of control circuits, and an annunciator in the car having circuits forming permanent junctions with said car control circuits at points on the car and having a common return or travelling wire without a break therein so that, such portion of the annunciator circuit is always completed whether the car is on push-button or car switch control.

13. In combination, the car, a push-button at a landing, a push-button on the car, a floor-relay having a winding, parallel wires connecting with one of the terminals of said relay winding, one of said wires connecting with the landing push-button and the other with the car push-button, and an annunciator in the car having a circuit branching from said wire which connects with said car push-button at a point adjacent said button, and car control means responsive to said push-buttons, at a landing and on the car.

14. In combination, the car, a pushbutton in the car, a floor-relay having a winding and a circuit therefor controlled by said push-button, an annunciator in the car, and a circuit for said annunciator tapped off said first named circuit at a point adjacent said push-button, and car control means responsive to said push-button.

15. In combination, the car, a push-button in the car, a floor-relay having a winding, an annunciator in the car, a circuit responsive to said push-button, connecting said relay winding and annunciator in parallel to energize both simultaneously, and a holding circuit for said relay winding to maintain the floor-relay closed thereby to keep said annunciator circuit energized to maintain registration of the call, and car control means responsive to said push-button.

VINCENT FEDERICI.